Patented Feb. 5, 1935

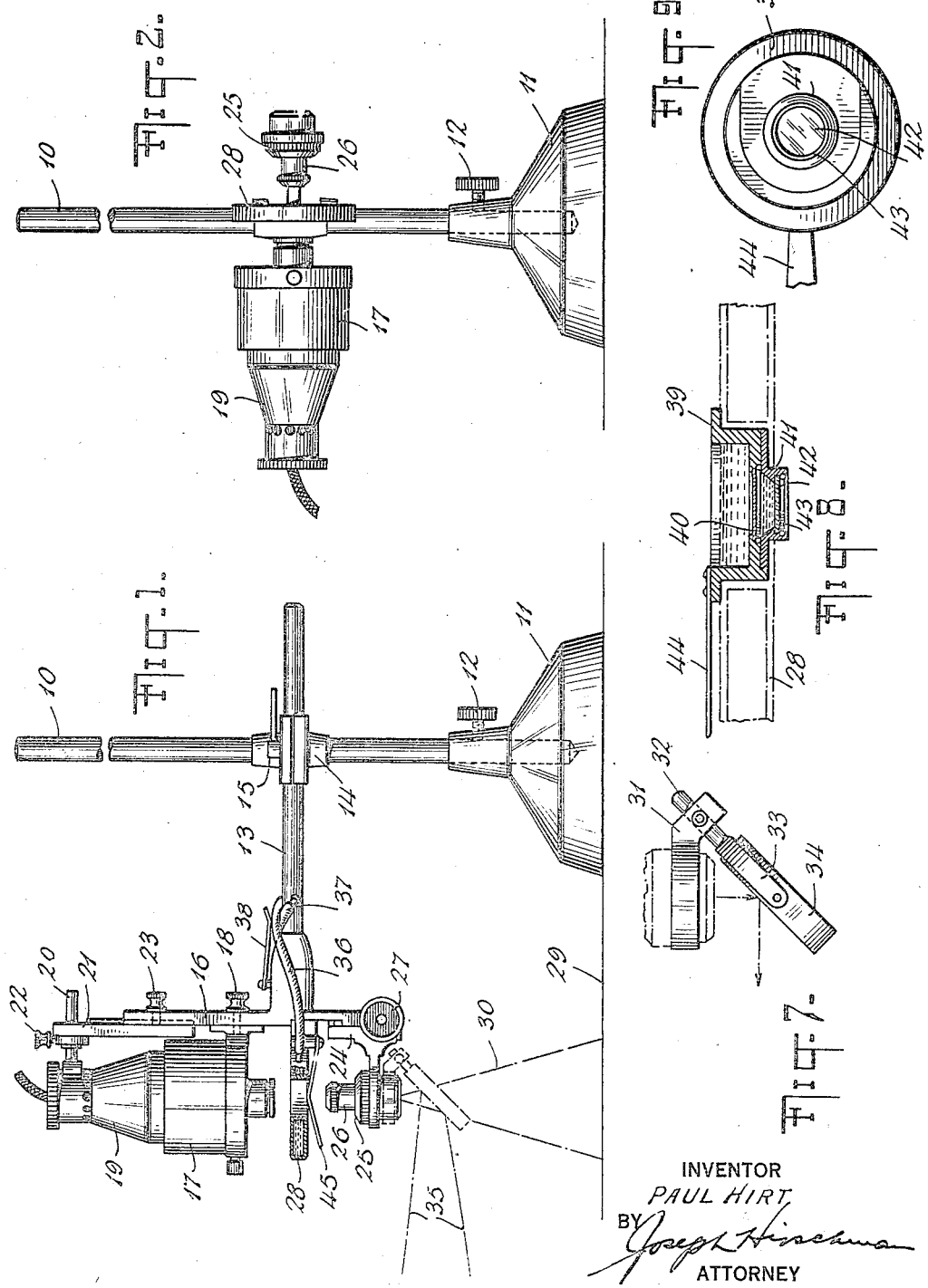

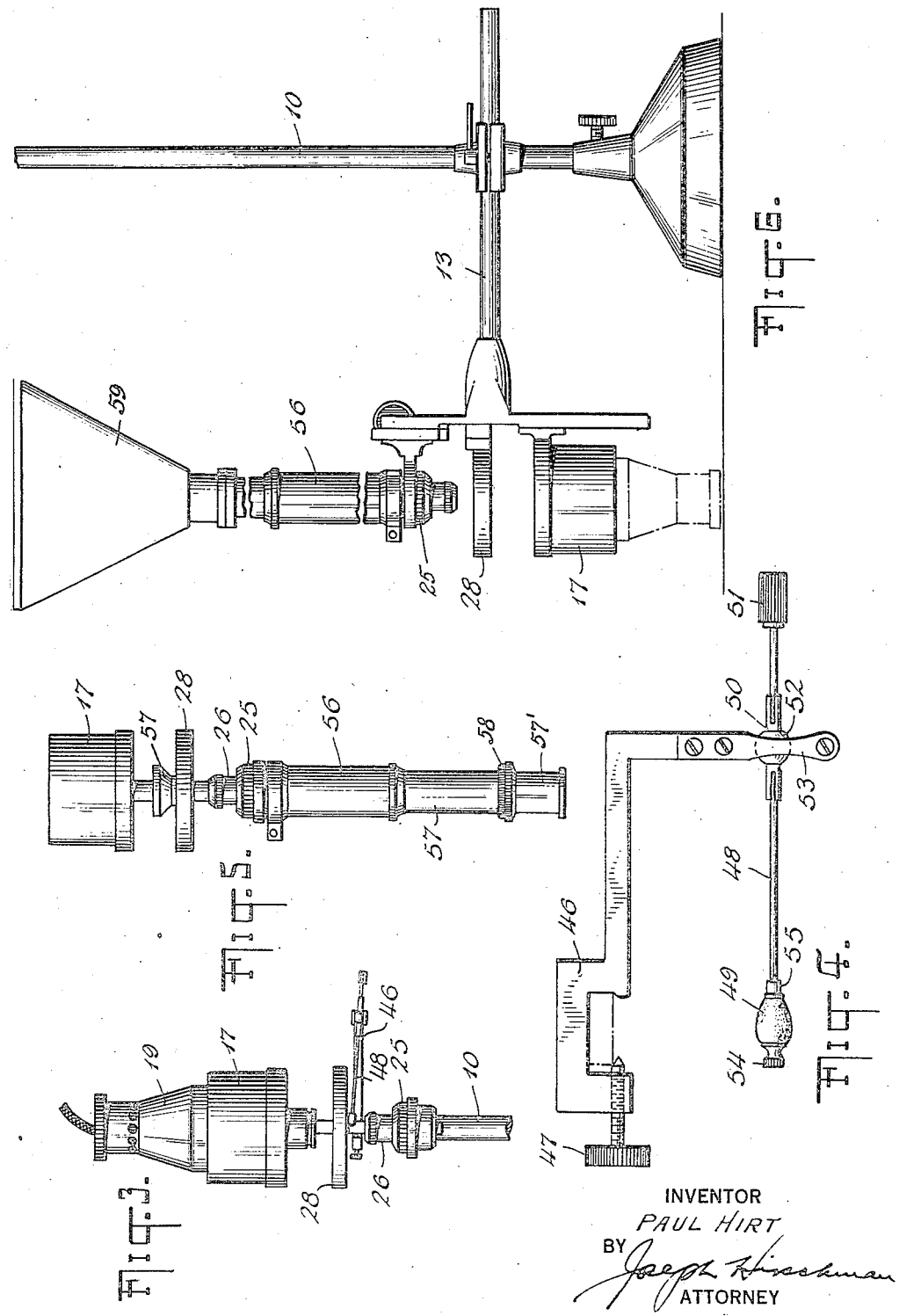

1,989,691

UNITED STATES PATENT OFFICE 1,989,691

PROJECTING MICROSCOPE

Paul Hirt, Wetzlar, Germany, assignor to Clay-Adams Company, Inc., New York, N. Y., a corporation of New York Application November 21, 1930, Serial No. 497,115

4 Claims. (Cl. 88—24)

My invention relates to microscopes, and more particularly to microscopes of the type known as micro-projectors wherein an object under investigation may be magnified and projected onto a table, wall or screen at a distance from the instrument.

It is the general object of the invention to improve the construction of the several parts of a projecting microscope so as to increase the utility, widen the field of application and increase the facility of manipulation of such an instrument.

It is a particular object of the invention to provide a novel mounting for a microscope of this type such that the instrument is rendered capable of projecting an object onto a horizontal surface and is adjustable relative to such surface to vary the size of the image, and is also capable of a variety of other adjustments parallel to and perpendicularly of such surface, the nature of which will be set forth more fully hereinafter.

It is also an object of the invention so to construct certain of the parts of the instrument that they are rendered capable of receiving a number of attachments which extend the field of utility of the instrument.

Another object of the invention is to provide an adjunct for a micro-projector with the aid of which living creatures and organisms are protected against the heat of the lamp of the projector while being examined.

It is a further object of the invention to provide an attachment for a micro-projector wherewith all parts of an insect or other object to be examined may be exposed to view.

The present invention also contemplates the provision of a mounting for a micro-projector so constructed that micro-photographs can readily be made without the aid of a camera.

Other objects of the invention will become apparent from the following description, and the features of novelty will be pointed out in the accompanying claims.

Embodiments of the various features of the invention are illustrated by way of example on the accompanying drawings. In said drawings, Fig. 1 is a view in elevation of a projecting microscope illustrating certain of the features of the invention;

Fig. 2 is a similar view showing the projector in position for projecting the image of an object against a vertical wall or screen;

Fig. 3 shows a front view of the insect holder in position on the projector support;

Fig. 4 is an enlarged plan view of the insect holder;

Fig. 5 is a partial view in elevation showing a portion of the projector with the polarization attachments in place;

Fig. 6 is a side elevation showing a pyramidical screen and photographic plate holder in position for photographing an object located upon the stage of the instrument, the parts being inverted with respect to the position shown in Fig. 1, to function as a microscope;

Fig. 7 illustrates a detail showing a mirror attachment for reflecting the image of an object upon a screen when the projector is in a vertical position as shown in Fig. 1;

Fig. 8 is a vertical section through an attachment designed to contain a living organism and protect the same against the heat of the projector lamp; and Fig. 9 is a bottom plan view of the attachment shown in Fig. 8.

My improved micro-projector comprises a mounting formed of a vertical standard 10 which is adjustably mounted within a bore in a weighted base 11, the standard being secured in adjusted position by means of a screw 12. An arm 13 is supported in horizontal position upon the standard 10 by means of a bracket 14 comprising a vertical sleeve slidable along the standard and held in adjusted position by means of a screw similar to the screw 12 but not visible in the view illustrated in Fig. 1 and a horizontally extending split sleeve integral with the first mentioned sleeve and adapted to receive the arm 13, the horizontal sleeve being tightened about the arm 13 by a clamp 15. It will be clear that the arm 13 is rotatable about its longitudinal axis and also shiftable along such axis within the horizontal supporting sleeve. Mounted upon the outer end of the arm 13 is a support or mounting bracket 16 consisting of oppositely extending plates along which the condenser housing 17 and objective holder 25 may be shifted and to which it is secured in adjusted position by means of a screw 18. The projector lamp is mounted in a casing 19 from which extends a rod 20 which passes through a hole in a bar 21 and is clamped in position on such bar by means of a screw 22. The bar 21 is provided with a tenon adapted to be received in a mortise in the support 16 and is secured in adjusted position upon the latter with the aid of a screw 23.

The bracket 16 is provided with a downwardly extending portion to which is attached a bracket 24 adapted to serve as a mounting for the objective holder 25, the latter supporting the objective 26 in known manner. The objective may be focused by operation of screw 27. As is clearly shown in Fig. 1, the micro-projector may be mounted upon my improved support 10, 13, 16 in such a manner that it is laterally removed from the base, that is, its horizontal projection is at a distance from such base, and the projector can, therefore, easily be made to project upon the supporting surface 29 the magnified image of an object supported upon the stage 28, as indicated by the dot-and-dash lines 30.

In order to enable an operator to project an object onto a vertical screen or wall when the projection mechanism is in the vertical position (Fig. 1) I provide a mirror attachment in the form of a circular clamp 31 (Fig. 7) to which is adjustably secured a stem 32, the latter being rotatable about and movable along its longitudinal axis. The stem 32 terminates in an arcuate member 33 to which is pivoted a mirror 34. By positioning the clamp 31 upon the bottom portion of the objective holder 25, or at the end of the ocular tube 56 described hereinbelow when the latter is used, and suitably adjusting the mirror at an angle of 45 degrees, the object positioned upon a horizontal stage can be projected on a vertical screen, as indicated by the dot-and-dash lines 35. When the apparatus is adjusted as shown in Fig. 2, the mirror may be so positioned as to reflect the object onto a horizontal surface.

As it is difficult to project certain living organisms that are sensitive to and easily killed by heat rays from the lamp, I have provided a structure whereby such organisms are effectively protected against heat. In accordance with the present invention the stage 28 is made in the form of a hollow annular chamber into which cooling water is conducted by means of a tube 36, the water being withdrawn through a tube 37. A spring clamp 38 may be mounted upon the support 16 to hold the tubes in place. The annular stage 28 is adapted to receive a micro-cuvette in the form of a cup-like member 39 (Fig. 8) having an opening in its bottom which is covered by a glass plate 40. The bottom of the member 39 is adapted to receive a holder 41 of a dish-like form having a bottom in the form of a glass or other transparent disc 42 held in place by a spring clip 43. The living organism is contained in a body of liquid in the holder 41. The member 39 may be filled with a liquid, such as water, which serves to insulate the holder 41 and its contents from the direct heat of the lamp. The member 39 may be provided with a handle 44 with the aid of which it can be positioned upon the water cooled stage 28. A clip 45 may be provided for holding a specimen slide in place against the bottom of the stage.

For the examination of all parts of an object, such as an insect and similar small objects, I provide an insect holder in the form of a bracket 46 which is adapted to be clamped to the support 16 by means of a screw 47. The bracket is of angular form as shown in Fig. 4, the screw 47 being located at one end thereof, while at the other end of the bracket I provide a universal mounting for a rod 48 at the end of which is arranged a cork head 49. The universal mounting includes a sleeve 50 within which the rod 48 can be rotated about and moved in the direction of its longitudinal axis with the aid of a finger piece 51. The sleeve 50 has an enlargement 52 in the form of a ball which is held between two arched extensions 53 of the bracket 46. It will thus be seen that the rod 48 can be rotated about its axis, shifted longitudinally of its axis, and tilted in all directions to expose every portion of an object impaled upon the cork head 49. The latter may be made removable, and to such end it is held in position by means of a thumb nut 54 which engages the suitably threaded end of the rod 48, the head 49 having a bore therethrough and being clamped against an abutment 55 on the rod 48.

The objective holder is adapted to receive a tube 56 containing the eyepiece when the instrument is to be used for increased magnification. For examination of crystals and in other instances in which polarized light is employed, a polarization attachment in the form of a polarizer 57 and analyzer 57' may be utilized, the latter housing an assembly of Nicol's prisms, the housing of the analyzer being so formed that it can readily be mounted upon the end of the tube 56, and being preferably provided with a spring holding device or other means for holding it in position. The polarizer consists of about 20 polished thin glass plates and carries a nickeled ring at its base which fits within the countersunk opening (see Fig. 8) in the stage 28. The polarizer housing is inserted into this ring from the condenser side (Fig. 5) and is lowered into the opening in the stage and is moved in until an abutment thereon (not shown) strikes the ring. The analyzer section contains the Nicol's prisms having inclined end surfaces in dust-proof engagement and is employed together with the tube.

As will be clear from the above, my improved apparatus may be employed to magnify and project microscopic slides and living organisms, including insects, in actual colors on a table or wall for drawing or demonstrations. The size of the image may be varied by varying the distance to which the image is projected, while still higher magnification may be obtained by using the tube and ocular and/or high power objectives. To use the apparatus as a microscope, the lamp is removed, the mirror is attached and the apparatus inverted.

Microphotographs may be made with this apparatus without the aid of a camera in one of two different ways, the apparatus being first suitably adjusted by placing the object in position on the stage, determining the magnification and selecting the proper light intensity. In both cases the exposure is produced by switching on the lamp. According to the first method, assuming that a dark room is available, the photograph is made in such dark room without any additional appliance, by placing a photographic plate or sensitized paper on the projecting surface, such as the table, and switching the light on and off momentarily. In a light room the photograph is made by the use of a pyramidic plateholder 59 (Fig. 6) attached to the end of the objective holder 25 or to the end of the ocular tube 56 when the latter is employed, the holder receiving a removable sensitized plate.

The lamp casing 19 is made adjustable in order to furnish the maximum of light necessary for each of the different objectives that may be employed.

When the instrument is to be used as a drawing apparatus with the tube and ocular attached, it is preferable to swing it into a horizontal position and by the use of the mirror 34 reflect the image on the table. In this way a larger image is obtained than by the use of the tube in the vertical position.

By separating the stage from the lamp casing

I reduce the amount of heat absorbed by the slide or cuvette on such stage. If desired, the lamp casing may be heat-insulated from the metallic parts common to it and to the stage. The hollow stage may contain either a static or flowing body of cooling agent; while for certain investigations a heating agent may be charged into the stage to maintain it at constant temperature.

By making the condenser independent of the lamp housing I am better able to concentrate the light upon the front lens of the objective. In this way a sufficient amount of light falls upon the smaller front lenses of the more powerful objectives, so that by making the lamp casing, condenser housing and stage separate, I not only keep the stage cooler but obtain a better utilization of the stronger objectives.

Because of the fact that in the cuvette the object space is separate from the cooling space, the layer of liquid in the object space may be kept at a definite thickness and the object confined to practically a single plane, which is of advantage in focusing.

The observation of a preparation by polarized light must always take place between "crossed Nicols". The Nicol's prisms are crossed when there appears upon the table projecting surface an image which is as dark as possible. This is accomplished by revolving the analyzer over the ocular and simultaneously observing the projection surface. When the image is darkest, the preparation is inserted.

Parts of my invention may be used without others and variations may be resorted to within the scope of the appended claims without departing from the spirit of the invention.

I claim:

1. Apparatus for projecting enlarged images of microscopic objects upon vertical and horizontal planes comprising a base, a vertical standard mounted upon said base, a bracket slidable upon said standard, means for fixing said bracket in position, an arm rotatably mounted upon said bracket and extending laterally from the standard, said bracket including means for fixing said arm in adjusted position, plates extending in opposite directions from the outer end of said arm, a projector condenser adjustably mounted upon one of said plates, an objective holder adjustably mounted upon the other plate, and a stage positioned between the condenser and holder, said condenser, objective and stage being rotatable with said supporting plates and arm about a horizontal axis while maintaining their relatively adjusted position to project an image upon a horizontal or vertical plane.

2. Apparatus as set forth in claim 1, wherein said bracket comprises a vertically-extending sleeve receiving said standard, and a split horizontally extending sleeve for receiving said arm, said arm fixing means comprising a clamping screw for tightening the split sleeve about said arm, said sleeves being integral with each other, and said split horizontal sleeve being of sufficient length to hold the arm firmly against slipping under the action of the weight of the microscope and projector parts.

3. A supporting structure for the condenser, objective and stage of an apparatus for projecting enlarged images of microscopic objects upon vertical and horizontal planes comprising a base, a vertical standard mounted upon said base, a bracket slidable upon said standard, means for fixing said bracket in position, an arm rotatably mounted upon said bracket and extending laterally from the standard, said bracket including means for fixing said arm in adjusted position, plates extending in opposite directions from the outer end of said arm, one of said plates having means for adjustably mounting the condenser of the projector apparatus, an objective holder adjustably mounted upon the other plate, and a stage support positioned on said plates between the condenser mounting and the objective holder, said supporting plates and arm being rotatable with said condenser mounting, objective holder and stage support about a horizontal axis while maintaining their relatively adjusted position.

4. Apparatus as set forth in claim 3, wherein said bracket comprises a vertically-extending sleeve receiving said standard, and a split horizontally extending sleeeve for receiving said arm, said arm fixing means comprising a clamping screw for tightening the split sleeve about said arm, said sleeves being integral with each other, and said split horizontal sleeve being of sufficient length to hold the arm firmly against slipping under the action of the weight of the parts supported by said plates.

PAUL HIRT.